United States Patent
Conover et al.

(10) Patent No.: US 9,875,110 B2
(45) Date of Patent: Jan. 23, 2018

(54) DYNAMIC APPLICATION OVERLAY FOR REMOTE DESKTOP SERVERS

(71) Applicant: VMware, Inc., Palo Alto, CA (US)

(72) Inventors: Matthew Conover, Mountain View, CA (US); Jairam Choudhary, Sunnyvale, CA (US); Fei Huang, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 400 days.

(21) Appl. No.: 14/585,472

(22) Filed: Dec. 30, 2014

(65) Prior Publication Data

US 2015/0286389 A1     Oct. 8, 2015

Related U.S. Application Data

(60) Provisional application No. 61/976,573, filed on Apr. 8, 2014.

(51) Int. Cl.
*G06F 3/00* (2006.01)
*G06F 9/44* (2006.01)
*G06F 9/455* (2006.01)

(52) U.S. Cl.
CPC ............ *G06F 9/44* (2013.01); *G06F 9/45558* (2013.01); *G06F 2009/4557* (2013.01)

(58) Field of Classification Search
CPC .................... G06F 9/45558; G06F 2009/45583
See application file for complete search history.

(56) References Cited

U.S. PATENT DOCUMENTS

| | | | | |
|---|---|---|---|---|
| 8,224,796 B1* | 7/2012 | Shinde | ............. | G06F 17/30117 707/695 |
| 2010/0011351 A1* | 1/2010 | Tsvi | ..................... | G06F 3/0607 717/174 |
| 2011/0208979 A1* | 8/2011 | Saarinehn | ............ | G06F 15/167 713/193 |
| 2011/0276806 A1* | 11/2011 | Casper | .................. | G06F 21/602 713/189 |
| 2012/0331406 A1* | 12/2012 | Baird | ................ | G06F 17/30861 715/760 |
| 2013/0067564 A1* | 3/2013 | Fok Ah Chuen | ... | G06F 21/6218 726/17 |
| 2014/0075493 A1* | 3/2014 | Krishnan | ................ | G06F 21/31 726/1 |

* cited by examiner

*Primary Examiner* — Omar Abdul-Ali (57) ABSTRACT

Examples disclosed herein provide systems, methods, and software to provide individualized applications to remote desktop sessions. In one example, a method of operating a remote desktop server to provide individualized applications to remote desktop users includes identifying a request from a user for a remote desktop session. The method further includes, in response to the request, identifying one or more applications associated with the user that are stored in at least one hidden volume, and virtually overlaying application objects associated with the one or more applications in at least one non-hidden volume. The method also provides initiating the remote desktop session with the at least one non-hidden volume accessible to the user.

20 Claims, 7 Drawing Sheets

| APPLICATION FILTER TABLE 300 ||||
| USER ID 310 | APP 320 | APP 321 | APP 322 |
| --- | --- | --- | --- |
| 1 | ALPHA | DELTA | THETA |
| 2 | BETA | | |
| 3 | ALPHA | BETA | |
| ⋮ | ⋮ | ⋮ | ⋮ |
| n | DELTA | | |

DYNAMIC APPLICATION OVERLAY FOR REMOTE DESKTOP SERVERS

RELATED APPLICATIONS

This application is related to and claims priority to U.S. Provisional Patent Application No. 61/976,573, entitled "DYNAMIC APPLICATION ATTACHMENT FOR TERMINAL SERVERS," filed on Apr. 8, 2014, and which is hereby incorporated by reference in its entirety.

TECHNICAL BACKGROUND

Remote desktop services, sometimes referred to as Terminal Services, allow users to log in remotely from various client workstations and thin clients to view a desktop provided by the remote desktop server. This desktop may include drivers, files, applications, and other similar elements that allow the user to access the processing power of the remote desktop server from a remote location. As a result of a single desktop being provided to multiple end users, the applications for the desktop may only need to be installed once, allowing each of the users' access to the applications without multiple installations.

Although remote desktop servers may be configured as physical machines in some examples, the remote desktop servers may also comprise virtual machines. These virtual machines may be configured to execute on top of a hypervisor that abstracts the physical characteristics of the host computing system and provides them to the virtual machine. The virtual machines allow a single host computing system to provide a plurality of remote desktop servers and configurations for the clients that attempt to connect to the remote desktop environment. For example, one remote desktop server may provide the applications necessary for an engineer, while a second remote desktop server may provide the applications necessary for a person in marketing. However, managing the applications and updates for remote desktop servers with different applications can be inefficient and burdensome to the administrators of the remote desktop environment.

OVERVIEW

Examples disclosed herein provide systems, methods, and software for operating a remote desktop server to offer individualized applications to end user devices. In one example, a method of operating a remote desktop server to provide individualized applications to remote desktop users includes identifying a request from a user for a remote desktop session. The method further includes, in response to the request, identifying one or more applications associated with the user that are stored in at least one hidden volume, and virtually overlaying application objects associated with the one or more applications in at least one non-hidden volume. The method also provides initiating the remote desktop session with the at least one non-hidden volume accessible to the user.

In another instance, a computer apparatus to provide individualized applications to remote desktop users includes processing instructions that direct a computing system to identify a request from a user for a remote desktop session. The processing instructions further direct the computing system to, in response to the request, identify one or more applications associated with the user that are stored in at least one hidden volume, and virtually overlay application objects associated with the one or more applications in at least one non-hidden volume. The processing instructions also direct the computing system to initiate the remote desktop session with the at least one non-hidden volume accessible to the user. The computer apparatus further includes one or more non-transitory computer readable media that store the processing instructions.

In a further example, a system to provide individualized applications to remote desktop end users includes one or more hidden volumes that store a plurality of applications. The system further includes a processing system configured to identify a request from a user for a remote desktop session. The processing system is further configured to, in response to the user request, identify one or more applications associated with the user that are stored in the one or more hidden volumes, and virtually overlay application objects associated with the one or more applications in at least one non-hidden volume. The processing system is also configured to initiate the remote desktop session with the at least one non-hidden volume accessible to the user.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Remote desktop servers allow users to login remotely from various client workstations and thin clients to view a desktop provided by the remote servers. These desktop servers may operate using Microsoft Remote Desktop Service, Microsoft Terminal Service, Citrix XenApp, or any other similar service that allows users to remotely access a desktop generated by the physical or virtual remote desktop computing system. To present the desktop to the requesting users, each remote desktop server in a serving environment includes installed applications that can then be initiated by the user client devices. Accordingly, when a user requests a remote desktop session, the remote desktop server may provide a volume that includes one or more of the installed applications.

In the present example, applications that are stored for the remote desktop servers are stored within hidden application volumes that are inaccessible to the requesting users. Thus, when an application is required for a user, the application must be virtually overlaid into a non-hidden storage volume that is accessible to the user. For instance, a user may request a session with a remote desktop server. Responsive to the request, the server may identify one or more applications associated with the user based on the user name, group name, or other login credential provided by the end user. These applications may include productivity applications, gaming applications, image or video editing applications, or any other similar application. Once the applications are identified, the server virtually overlays application objects associated with the one or more applications into a non-hidden volume that can be made available to the end user. These application objects may include visible pointers to the files and directories that are necessary for the application to execute.

For example, when applications are installed in the hidden volume of the remote desktop server, the files and directories necessary for the applications to execute may be maintained by a filter that is used to provide applications to end users. Accordingly, when the user requests a new session, the applications are identified, and pointers to the necessary objects are made viewable to the user within a non-hidden volume, such as the C: drive for Microsoft Windows desktops. Consequently, when the desktop is presented to the user, the user may select one of the viewable pointers associated with the application and execute the application via the application objects stored in the hidden repository. Thus, rather than filtering application objects out of storage volumes to be presented to the user, the application objects are virtually added to a non-hidden volume to be made available to the end user.

In some examples, organizations may employ a plurality of remote desktop servers to provide members of the organization required applications. Accordingly, rather than individually managing server configurations for each group or personnel member within the organization, a file system filter may be used to actively add necessary applications for each personnel member of the organization. This allows a single image with all of the applications to be used for each of the plurality of remote desktop servers. However, when a user requests desktop, such as an engineer, only applications specific to the user will be made available in a non-hidden volume. Accordingly, the organization may save resources in only licensing necessary applications to each personnel member.

Figure 1:
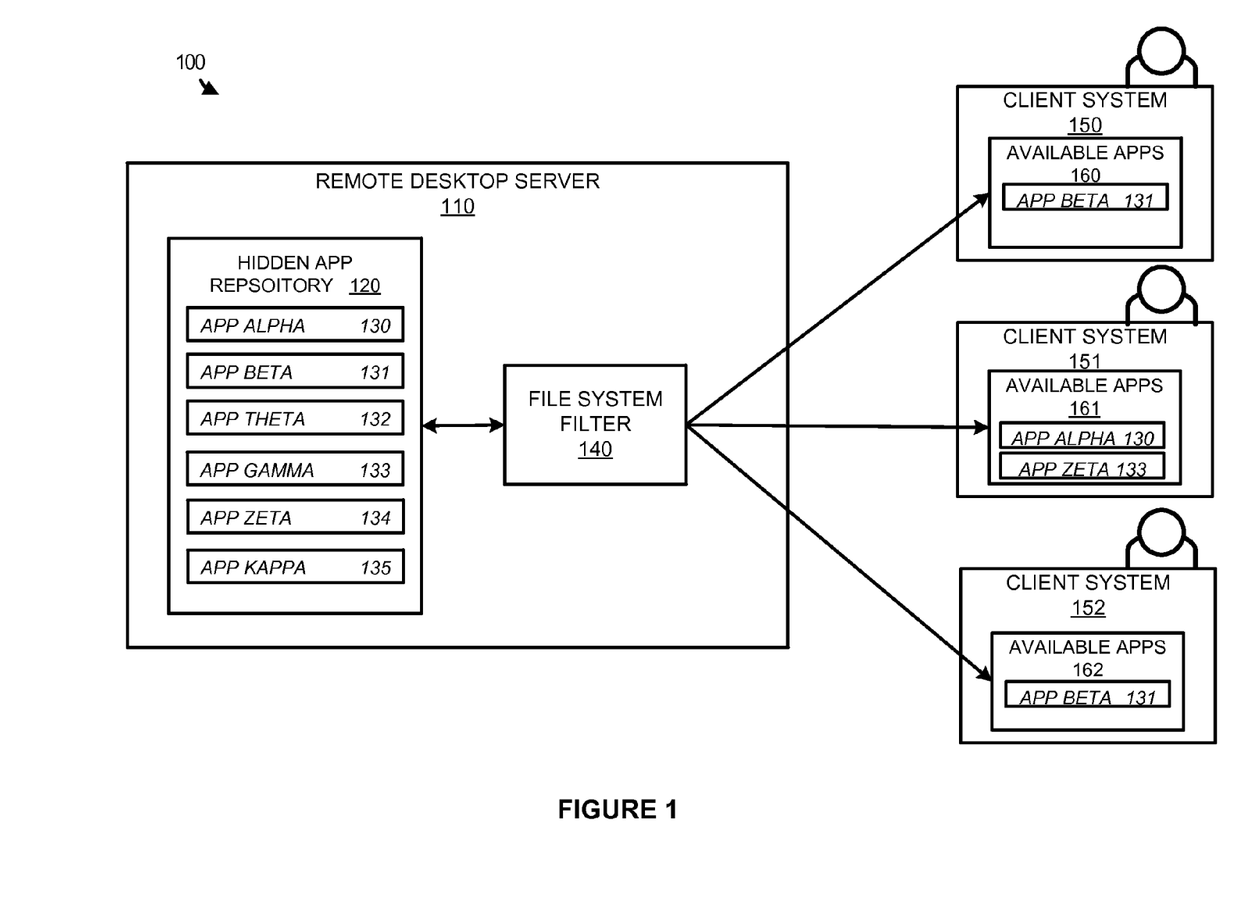
FIG. 1 illustrates a computing environment for providing individualized applications and desktops to end users.

Referring now to FIG. 1, FIG. 1 illustrates a computing environment 100 for providing individualized applications and desktops to end users. Computing environment 100 includes remote desktop server 110 and client systems 150-152. Remote desktop server 110 further includes hidden file system filter 140 and hidden application repository 120 that stores applications 130-135. Client systems 150-152 further include available applications 160-162 for each of the respective sessions.

Remote desktop server 110 may include any real or virtual computing system capable of providing remote desktop services. These remote desktop services include providing desktops to end user systems that allow the end user systems to use the applications and processing capabilities of remote desktop server 110. Remote desktop server 110 may include processing systems, storage systems, user interfaces, communication interfaces, or other similar computing elements. Examples of remote desktop server 110 include server computers, desktop computers, and the like, as well as virtual representations of server computers, desktop computers, and the like.

Client systems 150-152 may include any device capable of initiating guest sessions on remote desktop server 110. Client systems 150-152 may include end user devices, such as subscriber equipment, customer equipment, access terminal, smartphone, personal digital assistant (PDA), computer, tablet computing device, Internet appliance, media player, game console, or some other user computing apparatus, including combinations thereof. Client systems 150-152 may each include processing systems, storage systems, user interfaces, communication interfaces, or other similar computing elements.

In operation, remote desktop server 110 is configured to provide a visual desktop to remote end users. This desktop may include applications, drivers, storage, and any other necessary elements to provide the users with an interactive remote desktop. In the present example, remote desktop server 110 includes hidden application repository 120 that comprises one or more storage volumes to store applications 130-135. During setup of remote desktop server 110, an administrator or some other administration mechanism may install applications within hidden application repository 120. These storage volumes are invisible to the end user devices and the stored application objects are only made accessible when a user has permission to access a particular application.

Once a remote session is initiated by one of client systems 150-152, file system filter 140 determines application permissions for the end user of the client system. These application permissions may be based on the occupation of the end user, the quality of service for the end user, or any other method of defining permissions. For example, one user may be an engineer and require specific engineering applications, and an account manager, who logs into the same server, may require business applications. As a result, different applications may be provided to each of the respective end users via non-hidden volumes, while the applications that are not required remain hidden to the end user.

Figure 2:
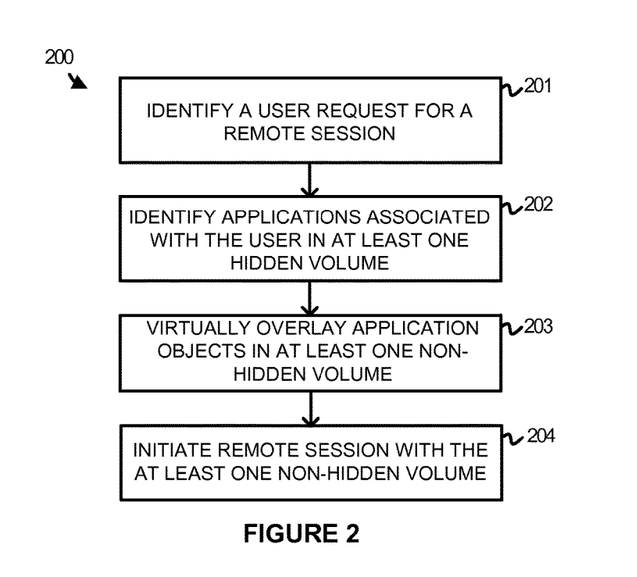
FIG. 2 illustrates a method of operating a remote desktop server to provide individualized applications to end users.

Turning to FIG. 2 to further demonstrate the operation of remote desktop server 110. FIG. 2 illustrates a method 200 of operating a remote desktop server to provide individualized applications to end user devices. The operations of FIG. 2 are referenced parenthetically in the description below.

In FIG. 2, the remote desktop server is configured to identify a user request for a remote session (201). Responsive to this request, the remote desktop server identifies one or more applications associated with the user in at least one hidden volume (202). Once identified, the remote desktop server virtually overlays application objects associated with the one or more applications in at least one non-hidden volume (203), and the remote session is initiated with the at least one non-hidden volume available to the user (204).

To virtually overlay the application objects, the remote desktop server is configured to make application objects, such as files and directories for the identified applications, appear as though they are available within a non-hidden volume. For instance, when the applications are installed in the hidden volume on the remote desktop server, the applications are stored within one or more hidden volumes that are inaccessible to users attempting to initiate a remote session. Once applications are identified for the user, a file system filter makes the application files, directories, and other application objects appear as though they are stored within an accessible volume for the end user. Accordingly, although the actual application objects may be stored within one or more hidden volumes, the user will see pointers to the application objects within a non-hidden volume on their desktop.

Referring to FIG. 1 as an example, remote desktop server 110 includes a plurality of applications 130-135 that are installed in hidden application repository 120. Hidden application repository 120 may comprise one or more storage volumes that are not visible to the connecting session devices. Once a device attempts to initiate a session, such as client system 150, file system filter 140 identifies the applications that are appropriate for the user of client system 150. These determinations may be made by an administrator, a quality of service defined by the user of client system 150, or by any other method. In response to identifying the applications, file system filter 140 virtually overlays the application objects necessary for the application within a volume that is visible on the desktop for client system 150. For instance, in addition to hidden application repository 120, each desktop that is provided to the end users includes at least one non-hidden volume that is accessible to the end user. To provide the applications, file system filter 140 will make the files, directories, and other application objects visible within the non-hidden volume.

Referring still to the example in FIG. 1, client system 150 includes permissions to execute application beta 131. To provide application beta 131, file system filter 140 makes the necessary application objects for application beta 131 appear as though they are located within a non-hidden volume on the desktop presented to the end user. Once the objects are made available in the non-hidden volume, the remote session may be initiated for client system 150, allowing the user access to the predefined applications.

Figure 3:
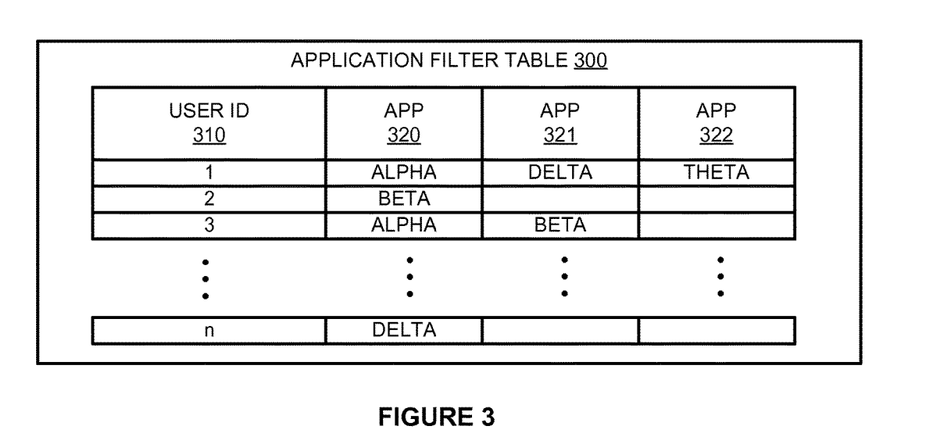
FIG. 3 illustrates a table for associating applications with end users.

Referring now to FIG. 3, FIG. 3 illustrates an application filter table 300. Application filter table 300 is an example data structure that might be used by a file system filter to provide the appropriate applications to end user devices. Application filter table 300 includes user identification (ID) 310, and associated applications 320-322. Although illustrated as a table in the present example, it should be understood that a file system filter might employ an array, tree, linked list, or any other data structure.

In operation, a remote desktop server may have a variety applications installed for an assortment of different users. Some users may use all of the applications, some users may use a portion of the applications, and some users may use a single application. To provide users with the appropriate applications, the users may be assigned a user identification 310, which assists the remote desktop server in associating the appropriate applications to a requesting user. This user identification 310 may be assigned to a group of users, may be assigned individually, or may be assigned in combination, such that a user may have both a group identification as well as an individual identification.

Once the users are assigned identifiers, applications may be assigned to each of the IDs. For example, a first ID may be for all users that are engineers. Thus, the applications of applications 320-322 that are assigned to the engineering group may include various engineering applications. In contrast, a second ID may be assigned to account managers or some other business profile. Rather than giving these users the same applications as the engineers, the profile may be associated with various business applications to assist the business end user.

Upon storing the user IDs 310 and the application profiles, users may attempt to initiate a desktop session that is provided by the remote desktop server. Responsive to the initiation request, which may include the user entering a user name and password, a file system filter may take the identity of the requesting user and look to application filter table 300 for the appropriate applications associated with the end user. For instance, a user with the ID of one may be provided with applications alpha, delta, and theta. Once the applications are identified, the file system filter may overlay the application objects, such as files and directories, within a non-hidden volume such that the user may have access to the applications.

Prior to the session request of the end user, the applications on the remote desktop server are stored within a hidden volume that is inaccessible to the end users. As a result, when applications are needed for a user-initiated session, the applications need to become accessible to allow the user to find and execute the necessary files. To accomplish this task, the file system filter keeps track of the files and other objects necessary for the applications, and makes the objects viewable upon a session request. Although the application will not be transferred from the hidden volume to the non-hidden volume, the file system filter can make visible pointers within a non-hidden volume that allows the user to access and execute the application that is stored in the hidden storage volume. Once the applications are made available in a non-hidden volume, the session may be initiated for the end user with the applications available for execution.

Although illustrated in the present example with three applications available for each of the user IDs, it should be understood that any number of applications might be associated with each ID profile. Further, it should be understood that any number of user ID profiles might exist to provide the users with the appropriate applications.

Figure 4:
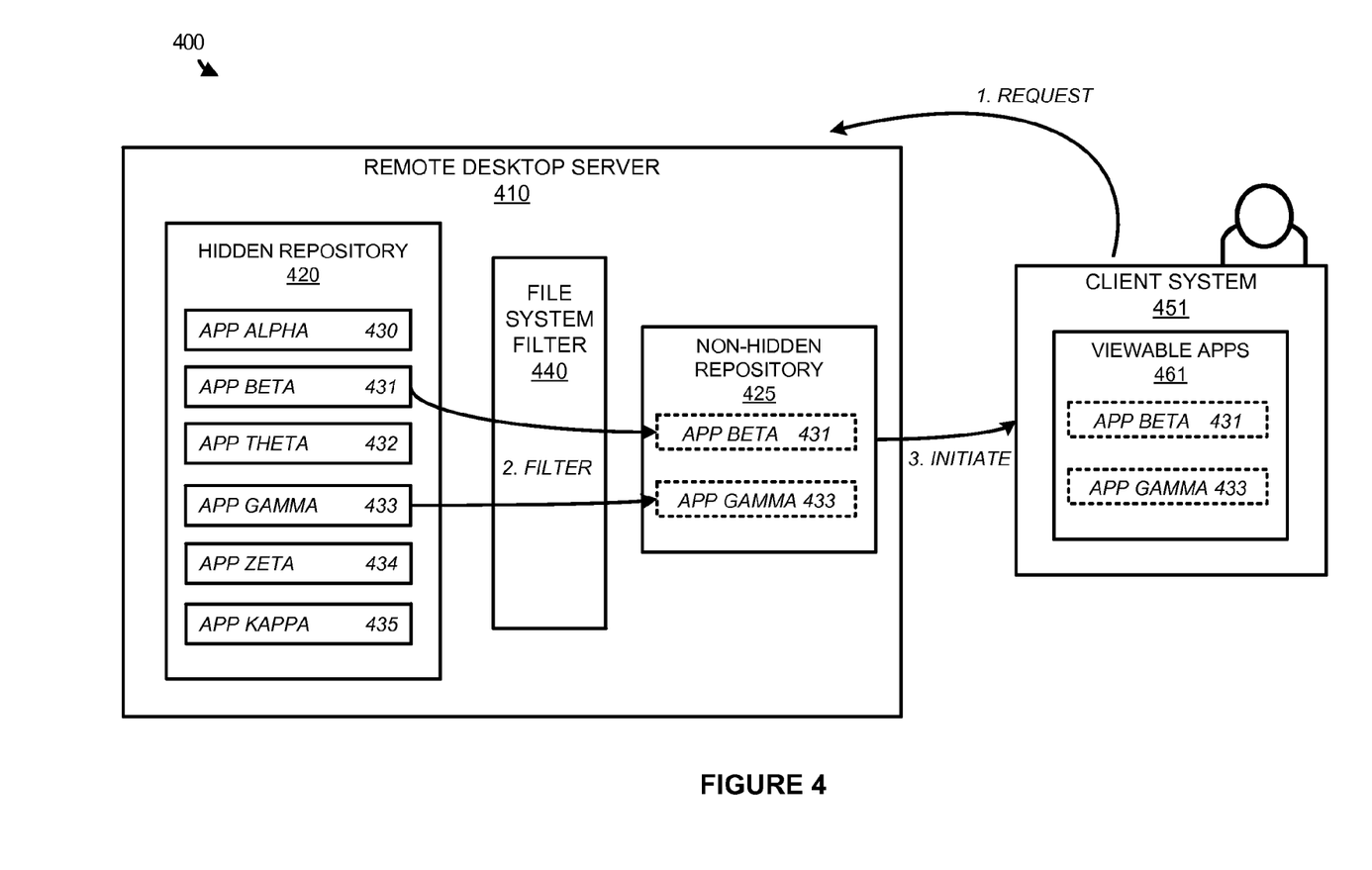
FIG. 4 illustrates an overview of providing individualized applications to an end user.

Turning to FIG. 4 to further demonstrate the filtering of applications, FIG. 4 illustrates an overview 400 for providing individualized applications to an end user using a remote desktop server. Overview 400 includes remote desktop server 410 and client system 451. Remote desktop server 410 further includes hidden repository 420, file system filter 440, and non-hidden repository 425.

In operation, remote desktop server 410 allows users to log in remotely from various client systems, such as client system 451, to view a desktop provided by the remote desktop server. This desktop may include drivers, files, applications, and other similar elements that allow the user to access the processing power of the remote desktop server from a remote location. In the present example, remote desktop server 410 includes a plurality of installed applications 430-435 that are stored within hidden repository 420. Hidden repository 420 may include one or more storage volumes that are inaccessible to the end users. These storage volumes may include storage drives, partitions, virtual hard drives, or any other similar volume.

Once a remote session request is transferred by client system 451 to remote desktop server 410, file system filter 440 is configured to filter or overlay the appropriate applications for client system 451 into a non-hidden repository 425. This non-hidden repository may comprise one or more storage volumes or drives that are accessible to the end user on the desktop provided by remote desktop server 410. To filter the applications, file system filter 440 keeps user profiles and maintains records of the application objects that are necessary for each of the profiles. Thus, using the example in FIG. 4, file system filter 440 identifies that application objects, such as files and directories, for application beta 431 and application gamma 433 are necessary for client system 451. Responsively, file system filter 440 will make these application objects appear as though they are located in non-hidden storage repository 425, giving the user access to the elements of the applications. Once the applications are available in non-hidden repository 425, the client desktop is initiated giving client system 451 viewable applications 461. These applications may then be executed and manipulated by the user of client system 451.

For example, a user may be presented with a C: drive on their remote desktop that includes various files and directories accessible to the user. Within the file system for the drive, visible pointers may be included that are associated with the application objects stored on the hidden volumes. Accordingly, using the example in FIG. 4, when the user of client system 451 selects a pointer associated with application beta 431, the application in hidden repository 420 may initiate execution.

Figure 5:
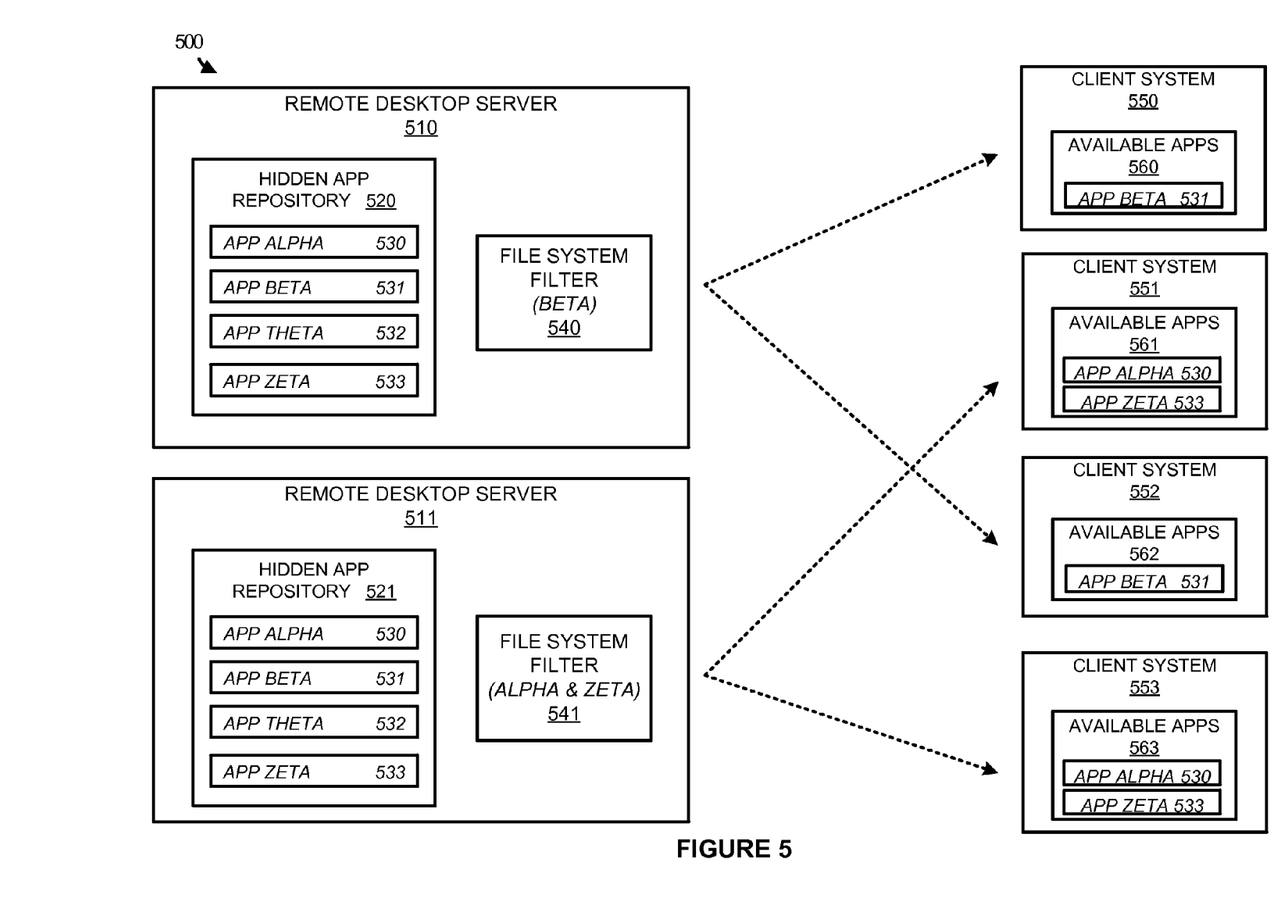
FIG. 5 illustrates an overview of providing multiple remote desktop servers with the same image.

Referring now to FIG. 5, FIG. 5 illustrates an overview 500 of providing multiple remote desktop servers with the same image. Overview 500 includes remote desktop servers 510-511 and client systems 550-553. Remote desktop servers 510-511 further include hidden application repositories 520-521 and file system filters 540-541.

As illustrated in overview 500, remote desktop servers 510-511 store hidden applications 530-533 that can be supplied to connecting client computing systems. In the present example, although the servers are configured with the same applications, each of the servers is configured to supply different applications to the connecting systems. For example, remote desktop server 510 may be configured for an engineer, whereas remote desktop server 511 may be configured for accounting or other business related persons. Accordingly, when the users attempt to communicate with a remote desktop server to receive a session desktop, the users will be directed to the appropriate server for their specific needs.

As demonstrated in remote desktop server 510, file system filter 540 is configured to filter application beta 531 to be supplied in the desktop for client systems 550 and 552. File system filter 540 is configured to identify the application objects, such as files and directories, within hidden application repository 520, and overlay these objects into a non-hidden repository. For instance, a supplied desktop for Microsoft Windows may include a non-hidden C: drive that contains all of the files and directories essential for Microsoft Windows to execute. When an application is necessary for a user, file system filter 540 may identify the necessary application objects and actively make the objects appear as though they are located in the non-hidden C: drive. Thus, the user will have access to application beta 531, although the application remains stored in hidden application repository 520.

Similarly, file system filter 541 is configured to filter and overlay the application objects for applications alpha 530 and zeta 533, allowing applications alpha 530 and zeta 533 to be presented in the desktop for client systems 551 and 553. Based on the configurations of remote desktop servers 510-511, client systems 550-553 may have available applications 560-563 that correspond to the individual user needs.

Although illustrated in the present example, as having separate file system filter configurations for the each of remote desktop servers 510-511, it should be understood that multiple filter configurations might be implemented on the same server. For example, the filter operations of file system filters 540-541 may be implemented within the same server. Accordingly, based on identifying the requesting user, the proper applications may be provided in the remote desktop.

Figure 6:
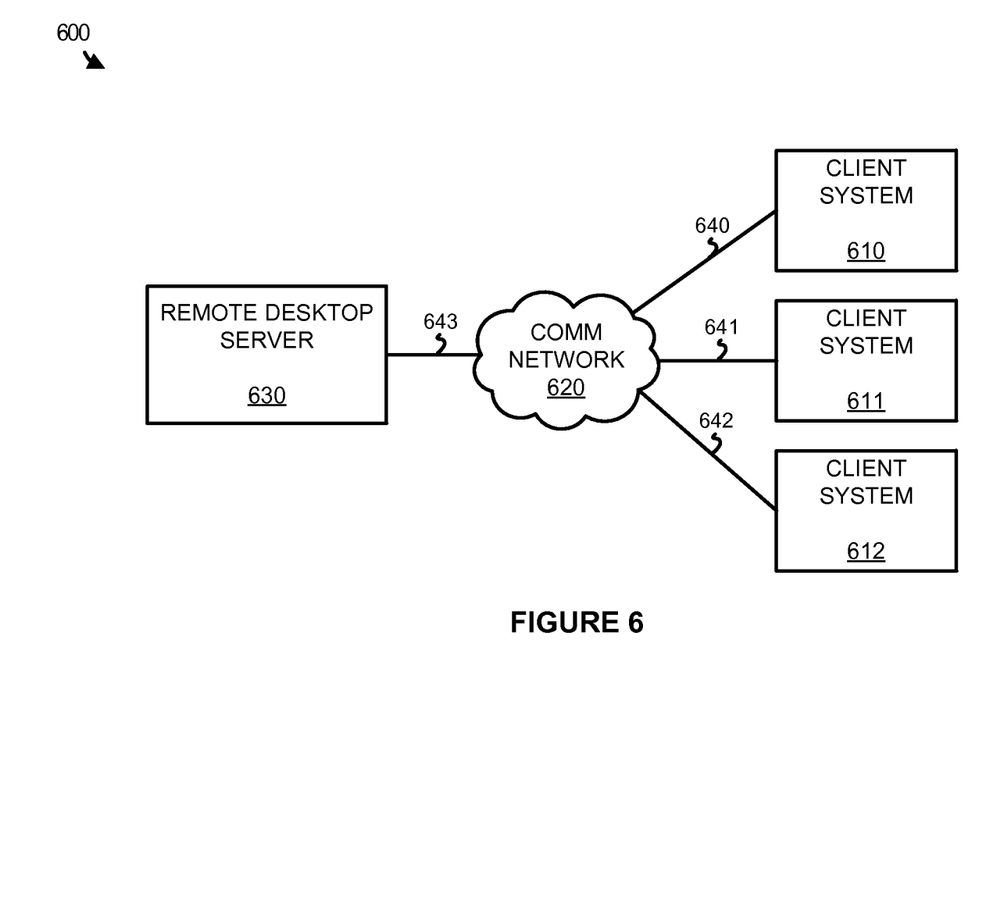
FIG. 6 illustrates a remote desktop server system for providing individualized applications to end users.

Turning to FIG. 6, FIG. 6 illustrates a remote desktop server system 600 for providing individualized applications to client systems. Remote desktop server system 600 includes client systems 610-612, communication network 620, and remote desktop server 630. Client systems 610-612 communicate with communication network 620 over communication links 640-642, respectively. Communication network 620 communicates with remote desktop server 630 over communication link 643.

In operation, remote desktop server 630 is configured to provide desktops to client systems 610-612 that include individualized applications for each of the client systems. In particular, remote desktop server 630 stores applications on one or more hidden volumes that are typically inaccessible to the connecting client systems. When a client device, such as client system 610, attempts to establish a client session with remote desktop server 630, remote desktop server 630 is configured to identify applications that need to be available for the device. This identifying of applications may be done based on user profiles for the client systems, may be done based on a group profile for the client system, may be done based on a quality of service for the user system, or any other method of identifying specific applications. In at least one example, specific applications may be identified based on the profession of the connecting user, such that business, engineering, and marketing may all contain a different set of applications. Once remote desktop server 630 determines the applications, the applications are virtually overlaid into a non-hidden volume that gives access to the applications for the end user.

Referring again to the instance of client system 610 requesting a session, remote desktop server 630 will identify the appropriate applications and virtually overlay application objects, such as files and directories, into a non-hidden volume for the desktop provided for client system 610. For instance, a C: drive or some other drive may be routinely provided in the desktop for client system 610. To make the necessary applications available, a file system filter on the remote desktop server will actively make the files, directories, and other application objects appear as though they have been installed within the users' available volumes. Although they appear in the available volumes, the applications will remain in the hidden volume, which allows different applications to become available to each of the connecting systems. Once the identified applications are filtered into the non-hidden volumes, the desktop may be made available to the end user of the client system.

Referring still to the elements of FIG. 6, remote desktop server 630 can include communication interfaces, network interfaces, processing systems, computer systems, microprocessors, storage systems, storage media, or some other processing devices or software systems, and can be distributed among multiple devices. Examples of remote desktop server 630 can include software such as an operating system, logs, databases, utilities, drivers, caching software, networking software, and other software stored on a computer-readable medium.

Client systems 610-612 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication network 620 comprises network elements that provide communication services to client systems 610-612 and remote desktop server 630. Communication network 620 may comprise switches, wireless access nodes, Internet routers, network gateways, application servers, computer systems, communication links, or some other type of communication equipment—including combinations thereof.

Communication links 640-643 each use metal, glass, optical, air, space, or some other material as the transport media. Communication links 640-643 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 640-643 can each be a direct link or can include intermediate networks, systems, or devices, and can include a logical network link transported over multiple physical links. Although one main link for each of links 640-643 is shown in FIG. 6, it should be understood that links 640-643 are merely illustrative to show communication modes or access pathways. In other examples, further links can be shown, with portions of the further links shared and used for different communication sessions or different content types, among other configurations. Communication links 640-643 can each include many different signals sharing the same associated link, as represented by the associated lines in FIG. 6, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 7:
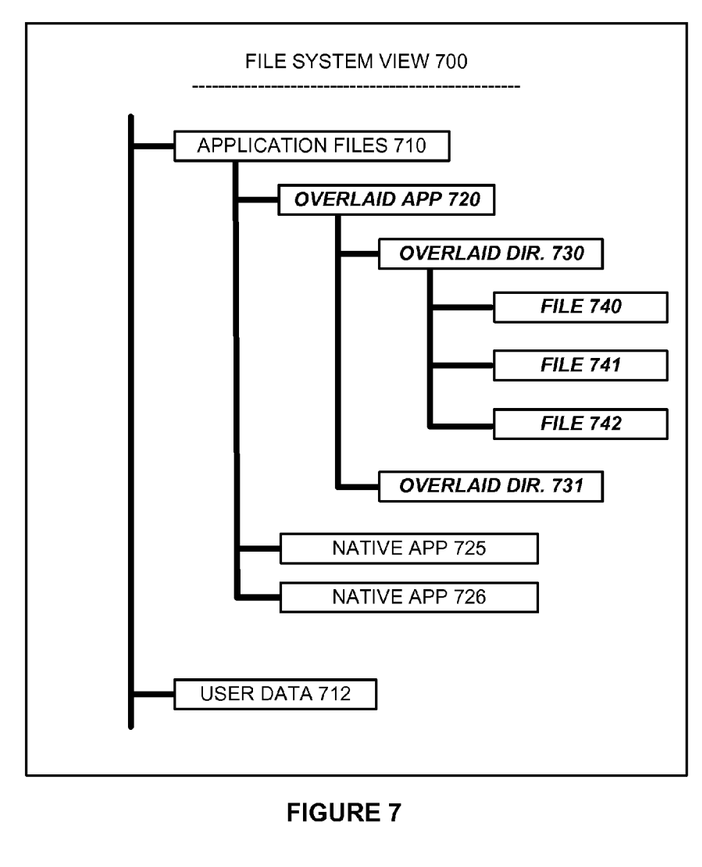
FIG. 7 illustrates a file system view for a remote desktop presented to an end user.

Referring to FIG. 7, FIG. 7 illustrates a file system view 700 for a remote desktop presented to an end user. File system view 700 includes application files 710, user data 712, overlaid application 720, and native applications 725-726. Overlaid application 720 further includes overlaid directories 730-731 and files 740-742.

As described herein, a user at a remote computing device may request a desktop from a remote desktop server. This remote desktop server allows users to execute applications via the processing systems of the remote desktop server, while providing a visual representation of the desktop at the remote computing device. This desktop includes at least one volume, such as a VHD or storage drive, accessible to the user that includes the applications, user files, and other software elements required by the user.

Here, in addition to applications 725-726 and user data 712 stored locally within the non-hidden volume, other applications associated with the particular user may be overlaid from one or more hidden volumes. As illustrated in FIG. 7, file system view 700 includes overlaid application 720 in addition to native applications 725-726. This overlaid application includes the necessary application objects, such as overlaid directories 730-731 and files 740-742, which are associated with overlaid application 720. These overlaid application objects, although visible within file system view 700, are not stored locally within the non-hidden volume presented to the user. Instead, when the user requires the application, the overlaid components act as visible pointers to the stored application objects within the one or more hidden volumes. Thus, when the user selects one of the visible pointers corresponding to the overlaid application, the application may be executed via the stored objects in the hidden volume.

For example, a user that requests a Microsoft Windows remote desktop may be presented with a C: drive and corresponding file system that includes various directories and files, such as application files 710 and user data 712. In addition to the objects that are stored with the users non-hidden C: drive, overlaid applications may be made visible within the C: drive although they are stored within one or more separate volumes. Thus, when the user selects an overlaid application from the C: drive, the application may be executed on the user desktop via the stored files and directories within the hidden volume.

Figure 8:
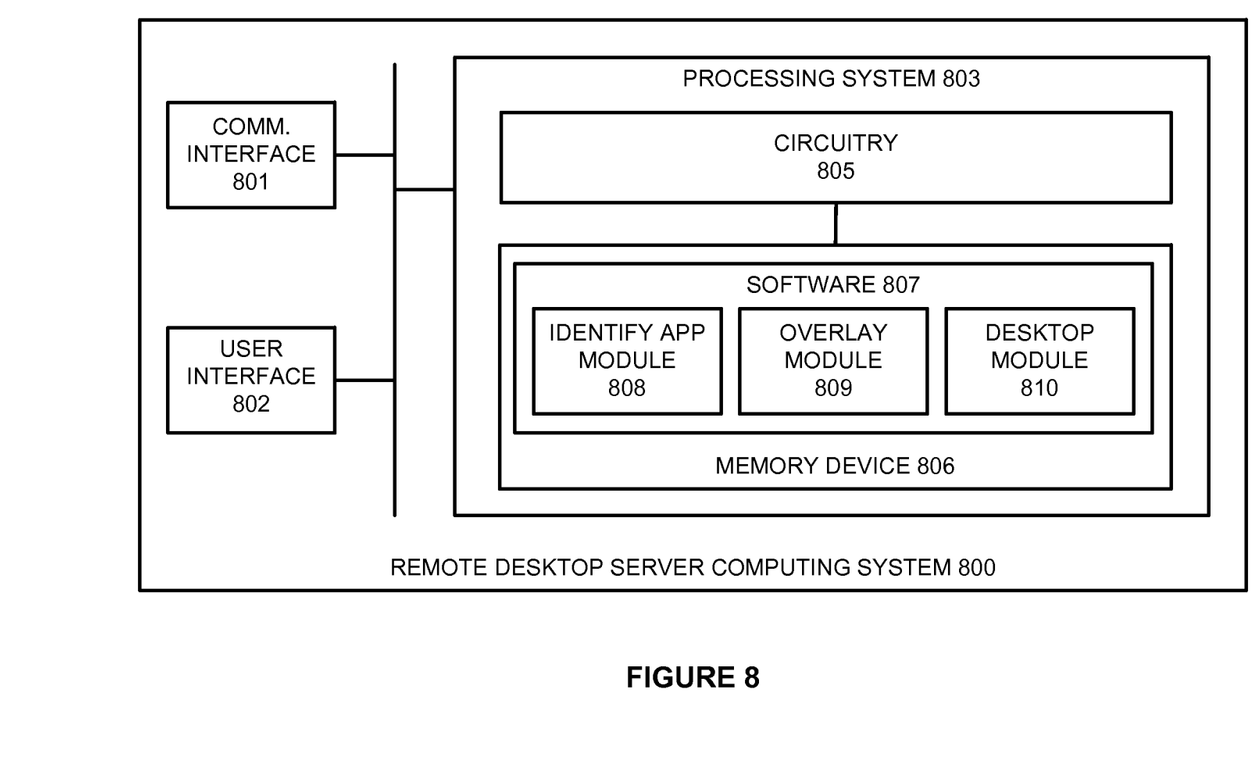
FIG. 8 illustrates a remote desktop server computing system according to one example.

Turning now to FIG. 8, FIG. 8 illustrates a remote desktop server computing system 800 for providing individualized applications to end user client devices. Remote desktop server computing system 800 is an example of remote desktop server 110, 410, and 630, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. Communication interface 801 may be configured to communicate with a plurality of client systems to provide a desktop to each of the client systems.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes identify application module 808, overlay module 809, and desktop providing module 810. Operating software 807 may further include an operating system, utilities, drivers, network interfaces, applications, or some other type of software. When executed by circuitry 805, operating software 807 directs processing system 803 to operate remote desktop server computing system 800 as described herein.

In particular, remote desktop server computing system 800 is configured to provide a desktop to a plurality of client devices that require a variety of different applications. To provide the needed applications, computing system 800 installs and stores the necessary files, directories, and other application objects in one or more hidden storage volumes. These storage volumes may comprise hard disk drives, solid state drives, partitions of a drive, virtual hard disks, or any other similar storage volume. Once the applications are stored, computing system 800 may receive desktop session requests from one or more client devices at communication interface 801. Responsive to these requests, identify application module 808 identifies the applications that are associated with the client devices. For example, each device may belong to one or more user profiles that specify the applications for each of the devices. These profiles may be based on job title, a work group, or any other profile characteristic.

Once the applications are identified within the hidden volume, overlay module 809 is configured to actively overlay the necessary application objects, such as the files and directories, into a non-hidden volume for the user. For example, a user may be given a volume that contains all of the files necessary for the users desktop. In addition to these necessary files, overlay module 809 makes the application objects for the required application appear as though they are in the non-hidden volume. As a result, the user may view and access the files and directories for the application, although the files and directories will remain in a hidden volume. Upon overlaying the necessary application elements, desktop providing module 810 may deliver the desktop to the user, allowing the user to execute the necessary applications.

Although illustrated in the present instance with three software modules, it should be understood that remote desktop server computing system 800 might include any number of software modules to provide individualized applications to session computing devices. Further, although illustrated in the present instance as a real computing system, it should be understood that remote desktop server computing system 800 might be implemented as a virtual computing system or virtual machine. As a virtual machine, computing system 800 may be configured to execute on top of a hypervisor that abstracts the hardware of a host machine and provides the abstracted elements to the virtual machine. This allows the virtual machine communicate with the client devices and provide a desktop with the required applications.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a remote desktop server to provide individualized applications to remote desktop users, the method comprising:
   in the remote desktop server, identifying a request from a user for a remote desktop session;
   in response to the request, identifying one or more applications associated with the user that are stored in at least one hidden volume;
   virtually overlaying application objects associated with the one or more applications in at least one non-hidden volume; and
   initiating the remote desktop session with the at least one non-hidden volume accessible to the user.

2. The method of claim 1 wherein virtually overlaying the application objects comprises making the application objects visible to the user within the at least one non-hidden volume.

3. The method of claim 2 wherein making the application objects visible to the user comprises making visible pointers available to the user in the at least one non-hidden volume that correspond to the application objects in the at least one hidden volume.

4. The method of claim 3 further comprising:
   receiving a request for a first application of the one or more applications in the at least one non-hidden volume; and
   executing the first application via the application objects in the hidden volume.

5. The method of claim 4 wherein receiving the request for the first application comprises identifying a user selection of a visible pointer for the first application in the at least one non-hidden volume.

6. The method of claim 1 wherein identifying the one or more applications associated with the user that are stored in the at least one hidden volume comprises:
   identifying a group associated with the user; and
   identifying at least one application associated with the group that is stored in the at least one hidden volume.

7. The method of claim 1 further comprising:
   identifying a second request from a second user for a second remote desktop session;
   in response to the second request, identifying one or more second user applications associated with the second user that are stored in the at least one hidden volume;
   virtually overlaying second user application objects associated with the one or more second user applications in one or more non-hidden volumes; and
   initiating the second remote desktop session with the one or more non-hidden volumes accessible to the second user.

8. The method of claim 7 wherein the one or more applications and the one or more second user applications include at least one shared application.

9. The method of claim 1 wherein the application objects associated with the one or more applications comprise directories and files associated with the one or more applications.

10. A computer apparatus to provide individualized applications to remote desktop users, the computer apparatus comprising:
    processing instructions that direct a computing system, when execute by the computing system, to:
       identify a request from a user for a remote desktop session at the computing system;
       in response to the request, identify one or more applications associated with the user that are stored in at least one hidden volume;
       virtually overlay application objects associated with the one or more applications in at least one non-hidden volume; and
       initiate the remote desktop session with the at least one non-hidden volume accessible to the user; and
    one or more non-transitory computer readable media that store the processing instructions.

11. The computer apparatus of claim 10 wherein the processing instructions virtually overlay the application objects direct the computing system to make the application objects visible to the user within the at least one non-hidden volume.

12. The computer apparatus of claim 11 wherein the processing instructions to make the application objects visible to the user direct the computing system to make visible pointers available to the user in the at least one non-hidden volume that correspond to the application objects in the at least one hidden volume.

13. The computer apparatus of claim 12 wherein the processing instructions further direct the computing system to:
  receive a request for a first application of the one or more applications in the at least one non-hidden volume; and
  execute the first application via the application objects in the hidden volume.

14. The computer apparatus of claim 13 wherein the processing instructions to receive the request for the first application direct the computing system to identify a user selection of a visible pointer for the first application in the at least one non-hidden volume.

15. The computer apparatus of claim 10 wherein the processing instructions to identify the one or more applications associated with the user that are stored in the at least one hidden volume direct the computing system to:
  identify a group associated with the user; and
  identify at least one application associated with the group that is stored in the at least one hidden volume.

16. The computer apparatus of claim 10 wherein the processing instructions further direct the computing system to:
  identify a second request from a second user for a second remote desktop session;
  in response to the second request, identify one or more second user applications associated with the second user that are stored in the at least one hidden volume;
  virtually overlay second user application objects associated with the one or more second user applications in one or more non-hidden volumes; and
  initiate the second remote desktop session with the one or more non-hidden volumes accessible to the second user.

17. The computer apparatus of claim 16 wherein the one or more applications and the one or more second user applications include at least one shared application.

18. The computer apparatus of claim 10 wherein the application objects associated with the one or more applications comprise directories and files associated with the one or more applications.

19. A system to provide individualized applications to remote desktop end users, the system comprising:
  one or more hidden volumes that store a plurality of applications;
  a processing system configured to:
    identify a request from a user for a remote desktop session at the processing system;
    in response to the user request, identify one or more applications associated with the user that are stored in the one or more hidden volumes;
    virtually overlay application objects associated with the one or more applications in at least one non-hidden volume; and
    initiate the remote desktop session with the at least one non-hidden volume accessible to the user.

20. The system of claim 19 wherein the processing system configured to identify the one or more applications associated with the user that are stored in the one or more hidden volumes is configured to:
  identify a group associated with the user; and
  identify at least one application associated with the group that is stored in the one or more hidden volumes.

* * * * *